United States Patent
Galvin et al.

(10) Patent No.: US 10,318,608 B2
(45) Date of Patent: Jun. 11, 2019

(54) SYSTEMS AND METHODS FOR LOW-RANK MATRIX APPROXIMATION

(71) Applicants: MASSACHUSETTS INSTITUTE OF TECHNOLOGY, Cambridge, MA (US); THE CHARLES STARK DRAPER LABORATORY, INC., Cambridge, MA (US)

(72) Inventors: Timothy Galvin, Cambridge, MA (US); Christopher C. Yu, Belmont, MA (US); Piotr Indyk, Cambridge, MA (US); Lei Hamilton, Lexington, MA (US); William Whitacre, Cambridge, MA (US)

(73) Assignees: MASSACHUSETTS INSTITUTE OF TECHNOLOGY, Cambridge, MA (US); THE CHARLES STARK DRAPER LABORATORY, INC., Cambridge, MA (US)

( * ) Notice: Subject to any disclaimer, the term of this patent is extended or adjusted under 35 U.S.C. 154(b) by 790 days.

(21) Appl. No.: 14/832,486

(22) Filed: Aug. 21, 2015

(65) Prior Publication Data
US 2016/0055124 A1 Feb. 25, 2016

Related U.S. Application Data

(60) Provisional application No. 62/040,051, filed on Aug. 21, 2014.

(51) Int. Cl.
*G06F 16/00* (2019.01)
*G06F 17/16* (2006.01)
*G06F 16/2457* (2019.01)

(52) U.S. Cl.
CPC ........ *G06F 17/16* (2013.01); *G06F 16/24578* (2019.01)

(58) Field of Classification Search
None
See application file for complete search history.

(56) References Cited

U.S. PATENT DOCUMENTS

| 7,945,061 | B1 * | 5/2011 | Smith | G06F 17/10 |
| | | | | 381/124 |
| 2008/0140751 | A1 * | 6/2008 | Ide | G06K 9/00536 |
| | | | | 708/520 |

OTHER PUBLICATIONS

Cambridge, "Matrix decompositions and latent semantic indexing"—Cambridge UP—2009—all pages. (Year: 2009).*

(Continued)

*Primary Examiner* — Son T Hoang
(74) *Attorney, Agent, or Firm* — Lando & Anastasi, LLP

(57) ABSTRACT

Systems and methods may identify at least a first set of right singular vectors and a first set of singular values of a subset of the matrix, reduce the subset by an amount of energy of a selected data entry of the subset based on the first set of right singular vectors and the first set of singular values, incorporate a new data entry from the matrix into the subset, update the first set of right singular vectors and the first set of singular values of the subset based on the new data entry by a singular value decomposition (SVD) update, and generate the low-rank approximation of the matrix based on the updated first set of right singular vectors and the updated first set of singular values.

15 Claims, 13 Drawing Sheets

(56) References Cited

OTHER PUBLICATIONS

Gu, M. et al. "A Stable and Fast Algorithm for Updating the Singular Value Decomposition" Yale University, New Haven, CT, 1994.
Liberty, Edo. "Simple and Deterministic Matrix Sketching", Proceedings of the 19th ACM SIGKDD International conference on Knowledge Discovery and Data Mining, pp. 581-588, 2013.
Vlisra, J. et al. "Finding Repeated Elements", Science of Computer Programming 2, pp. 143-152, 1982.

\* cited by examiner

SYSTEMS AND METHODS FOR LOW-RANK MATRIX APPROXIMATION

CROSS REFERENCE TO RELATED APPLICATIONS

This application claims priority under 35 U.S.C. § 119(e) to U.S. Provisional Application Ser. No. 62/040,051 titled "FASTER STREAMING ALGORITHMS FOR DETERMINISTIC LOW-RANK MATRIX APPROXIMATIONS," filed on Aug. 21, 2014, which is incorporated herein by reference in its entirety.

BACKGROUND

The cost of collecting information has been substantially reduced with the arrival of the Information Age. Sensing equipment, for example, has become increasingly inexpensive, accurate, and pervasive in society. Analyzing data with this sensing equipment may reveal new trends or relationships. The collected data, however, may be extremely large and contain billions of entries. Further, the collected data may be streaming data that is continuously growing as new information is gathered. Applying conventional data analysis techniques to these extremely large data sets to identify new relationships requires an immense amount of computational resources and high storage resources.

SUMMARY OF INVENTION

Aspects and examples are directed to various techniques for generating low-rank matrix approximations of large data sets. These low-rank matrix approximations are significantly smaller than the original data set and may be analyzed in a similar fashion to, for example, identify trends or locate features of interest in the data set. Thereby, low-rank approximations reduce the storage and/or computational requirements for analyzing these large data sets.

The low-rank matrix approximation techniques disclosed herein leverage the structural information revealed by performing singular value decomposition (SVD) on a given matrix to generate a compact representation of the input matrix that is a close approximation of the input. According to certain aspects, it is appreciated that performing (SVD) is a computationally expensive step that can be replaced by various incremental techniques to update a previously generated SVD with new information. As described in more detail below, employing SVD updates in place of the computationally expensive SVD operation reduces the computational complexity at minimal, if any, cost to the accuracy of the resulting low-rank approximation. Thereby, the low-rank approximation of an input matrix may be generated in less time with fewer computational resources.

According to one aspect, a system for generating a low-rank approximation of a matrix including a plurality of data entries is provided. The system includes a memory, at least one processor coupled to the memory, and a sketching component executable by the at least one processor. The sketching component may be configured to receive the matrix and at least one desired dimension of the low-rank approximation, identify at least a first set of right singular vectors and a first set of singular values of a subset of the matrix, reduce the subset by an amount of energy of a selected data entry of the subset based on the first set of right singular vectors and the first set of singular values, incorporate at least one new data entry from the matrix into the subset, update the first set of right singular vectors and the first set of singular values of the subset based on the at least one new data entry to produce an updated first set of right singular vectors and an updated first set of singular values, and generate the low-rank approximation of the matrix based on the updated first set of right singular vectors and the updated first set of singular values. It is appreciated that the sketching component may update the first set of right singular vectors and the first set of singular values by one or more singular value decomposition (SVD) update operations.

In some examples, the at least one desired dimension of the low-rank approximation includes at least one of a desired row size and a desired column size of the low-rank approximation. In some examples, the selected data entry of the subset is one of a data entry with a least amount of energy in the subset and a data entry with a median amount of energy in the subset. In some examples, the plurality of data entries in the matrix are representative of an image.

In some examples, the sketching component is configured to update the first set of right singular vectors and the first set of singular values by determining a singular value decomposition (SVD) of a combination of the first set of singular values and a projection of the new data entry onto the first set of right singular vectors to produce at least a second set of right singular vectors and a second set of singular values. The sketching component may be further configured to update the first set of right singular vectors and the first set of singular values based on at least the second set of singular values, the first set of right singular vectors, and the second set of right singular vectors.

In some examples, the sketching component is configured to update the first set of right singular vectors and the first set of singular values by projecting the new data entry onto the first set of right singular vectors and generating an orthonormal basis for an orthogonal component of the data entry to the first set of right singular vectors. The sketching component may be further configured to update the first set of right singular vectors and the first set of singular values by determining a singular value decomposition (SVD) of a combination of the first set of singular values, the projection of the new data entry onto the first set of right singular vectors, and the orthonormal basis to produce at least a second set of right singular vectors and a second set of singular values. In at least one example, the sketching component may be further configured to update the first set of right singular vectors and the first set of singular values based on at least the second set of singular values, the orthonormal basis, the first set of right singular vectors, and the second set of right singular vectors.

According to at least one aspect, a computer implemented method of generating a low-rank approximation of a matrix including a plurality of data entries is provided. The method includes receiving, by at least one processor, the matrix and at least one desired dimension of the low-rank approximation, the matrix containing a plurality of data entries, identifying, by the at least one processor, a first set of right singular vectors and a first set of singular values of a subset of the matrix, reducing, by the at least one processor, the subset by an amount of energy of a selected data entry of the subset based on the first set of right singular vectors and the first set of singular values, incorporating, by the at least one processor, at least one new data entry from the matrix into the subset, updating, by the at least one processor, the first set of right singular vectors and the first set of singular values based on the at least one new data entry to produce an updated first set of right singular vectors and an updated first set of singular values; and generating, by the at least one processor, the low-rank approximation of the matrix based on the updated first set of right singular vectors and the updated first set of singular values.

In some examples, updating the first set of right singular vectors and the first set of singular values includes determining a singular value decomposition (SVD) of a combination of the first set of singular values and a projection of the new data entry onto the first set of right singular vectors to generate at least a second set of right singular vectors and a second set of singular values. In these examples, updating the first set of right singular vectors and the first set of singular values may further include updating the first set of right singular vectors and the first set of singular values based on at least the second set of singular values, the first set of right singular vectors, and the second set of right singular vectors.

In some examples, updating the first set of right singular vectors and the first set of singular values includes projecting the new data entry onto the first set of right singular vectors and generating an orthonormal basis for an orthogonal component of the data entry to the first set of right singular vectors. In these examples, updating the first set of right singular vectors and the first set of singular values may further include determining a singular value decomposition (SVD) of a combination of the first set of singular values with the projection of the new data entry onto the first set of right singular vectors and the orthonormal basis to generate at least a second set of right singular vectors and a second set of singular values. In these examples, updating the first set of right singular vectors and the first set of singular values may further include updating the first set of right singular vectors and the first set of singular values based on at least the second set of singular values, the orthonormal basis, the first set of right singular vectors, and the second set of right singular vectors.

According to at least one aspect, a system for latent semantic indexing (LSI) is provided. The system for LSI includes a memory, at least one processor coupled to the memory, and a sketching component executable by the at least one processor. The sketching component may be configured to receive a term-document matrix defining a frequency of a plurality of terms in a plurality of documents and to generate a low-rank approximation matrix based on the term-document matrix. The LSI system may further include an approximated term-document generator executable by the at least one processor and configured to generate an approximated term-document matrix based on the low-rank approximation matrix. The LSI system may further include a scoring component configured to receive a query defining a search and apply the query to the approximated term-document matrix to generate at least one relevancy score.

In some examples, the approximated term-document generator is configured to generate the approximated term-document matrix at least in part by determining a product of the sketch matrix with a transposed version of the sketch matrix and determining a singular variable decomposition (SVD) of the product to determine singular values, left singular vectors, and right singular vectors of the product. In these examples, the approximated term-document generator may be configured to generate the approximated term-document matrix at least in part by constructing the approximated term-document matrix from the sketch in addition to the singular values, the left singular vectors, the right singular vectors of the product.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1A:
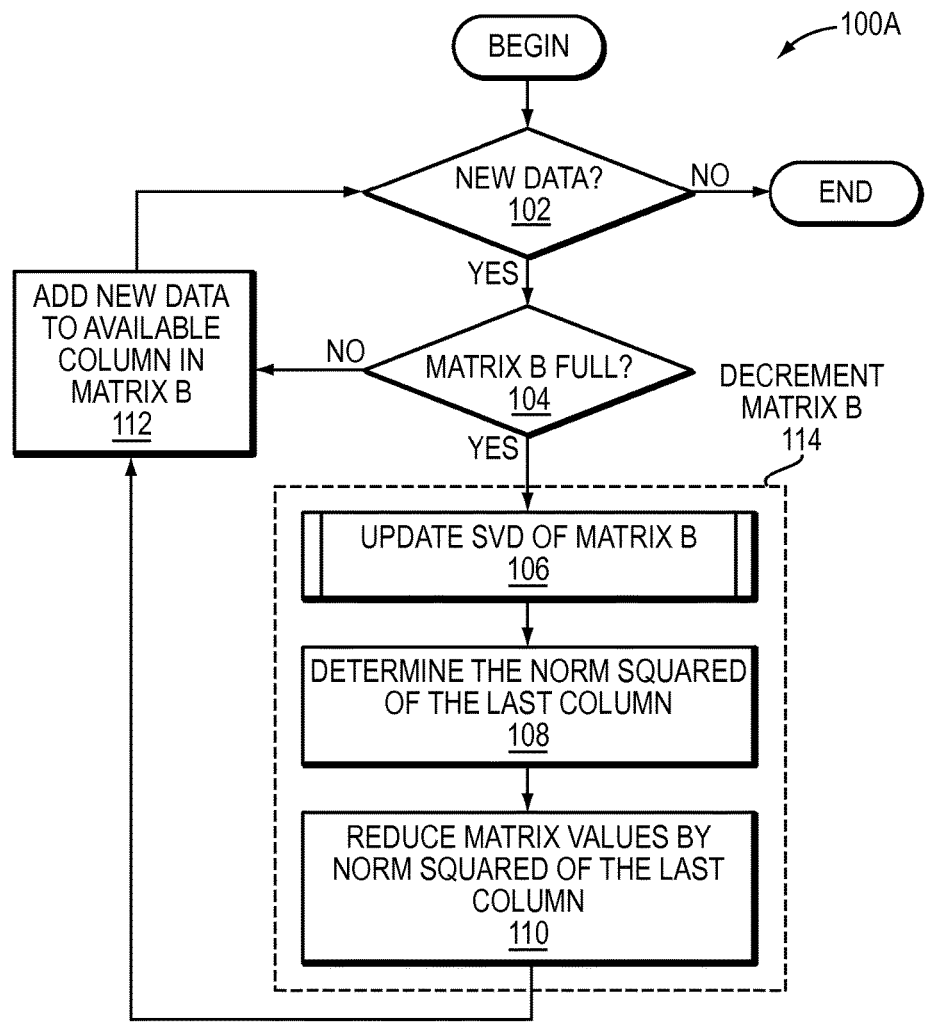
FIGS. 1A and 1B are flow diagrams of example matrix approximation processes.

Aspects and examples are directed to low-rank matrix approximations of large data sets. These low-rank matrix approximations are significantly smaller than the original input matrix and, thereby, reduce the storage and/or computational requirements for analyzing these large data sets. The low-rank matrix approximation techniques disclosed herein leverage the structural information revealed by performing singular value decomposition (SVD) on a given input matrix to generate a compact representation of the input matrix. Performing SVD, however, is a very computationally expensive operation. Replacing SVD operations with an incremental SVD update as described below reduces the computational complexity of determining a low-rank approximation of a matrix with only a minimal, if any, degradation of the accuracy of the resulting low-rank approximation.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements, and features discussed in connection with any one or more examples are not intended to be excluded from a similar role in any other example. Also, the phraseology and terminology used herein is for the purpose of description and should not be regarded as limiting. Any references to examples or elements or acts of the systems and methods herein referred to in the singular may also embrace examples including a plurality of these elements, and any references in plural to any example or element or act herein may also embrace examples including only a single element. The use herein of "including," "comprising," "having," "containing," "involving," and variations thereof is meant to encompass the items listed thereafter and equivalents thereof as well as additional items. References to "or" and "and/or" may be construed as inclusive so that any terms described using "or" and "and/or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Singular Value Decomposition

Singular value decomposition (SVD) reveals structural information about a matrix by reorganizing the data into subspaces that have the most variation. The SVD of a matrix A with n rows and m columns (e.g., an n by m matrix) decomposes the matrix A into three matrices including a U matrix, a $\Sigma$ matrix, and a V matrix as illustrated below in equations (1)-(4).

$$A = U\Sigma V^T = \Sigma_i u_i \sigma_i v_i^T \quad (1)$$

$$U = [u_1 \ u_2 \ u_3] \quad (2)$$

$$\Sigma = \begin{bmatrix} \sigma_1 & 0 & 0 \\ 0 & \sigma_2 & 0 \\ 0 & 0 & \sigma_3 \end{bmatrix} \quad (3)$$

$$V^T = \begin{bmatrix} v_1 \\ v_2 \\ v_3 \end{bmatrix} \quad (4)$$

The matrix U contains the left singular vectors $u_i$ of the matrix A. The matrix $\Sigma$ contains singular values $\sigma_i$ along the diagonal of the matrix $\Sigma$ and zeros for all of the other values. The number of singular values $\sigma_i$ in the matrix $\Sigma$ is equal to the rank r of the matrix A. The rank of a matrix A is the dimension of the vector space generated (or spanned) by its columns, which is the same as the dimension of the space spanned by its rows. The matrix V contains the right singular vectors $v_i$ of the matrix A.

SVD offers an additional useful property due to the reorganization of the data discussed above. The best rank-k approximation of a matrix A (referred to as $A_k$) may be obtained directly from the SVD of A by taking the first k left singular vectors $u_i$, the first k singular values $\sigma_i$, and the first k right singular vectors $v_i$ as illustrated below in equation (5).

$$A_k = U_k \Sigma_k V_k^T = \Sigma_i^k u_i \sigma_i v_i^T \quad (5)$$

The rank-k approximation of A ($A_k$) is smaller than A and, thereby, reduces the storage requirements of storing the information in the matrix A. The rank-k approximation may also remove noise from the matrix A by removing the smallest singular values (e.g., $\sigma_{k+1}$ through $\sigma_r$ are removed) and the smallest singular vectors (e.g., $u_{k+1}$ through $u_m$ and $v_{k+1}$ through $v_n$), which are representative of the data with the least amount of variation.

Various methods may be performed to determine the SVD of a given matrix A including, for example, QR decomposition. These methods, however, are of great computational complexity. Given an n by m matrix A with n≥m, calculating the SVD of A has order of $nm^2$ (e.g., $O(nm^2)$) time complexity. Performing SVD quickly becomes infeasible for large matrices because the SVD operation scales cubically with the dimensions of the input matrix. Accordingly, various methods may generate a low-rank approximation of A by performing one or more SVD operations on smaller matrices including, for example, matrix sketching as described in more detail below.

Matrix Sketching

Matrix sketching generates a significantly smaller matrix B that approximates the original matrix A without performing SVD of the entire matrix A. Due to the smaller size of the sketch B, it is inherently low-rank. The sketch B may have the same number of rows as the input matrix A and a configurable number of columns l that may be altered to reduce (or increase) the rank of the resulting sketch B. Conversely, the sketch B may have the same number of columns as the input matrix A and a configurable number of rows l. The number of columns (or rows) l in B may be substantially smaller than the number of columns (or rows) in A.

The matrix sketching techniques disclosed herein have particularly desirable characteristics including, for example, being deterministic, yielding mergeable results, and being capable of processing streaming data. Deterministic techniques provide a consistent output given the same input. For example, the matrix sketching techniques described herein yield the same sketch given the same input matrix. The mergeable result provided by these matrix sketching techniques enables the data to be processed in a parallel fashion by, for example, splitting the data set into multiple subsections, processing the subsections independently, and merging the results into a final sketch of the entire input matrix. The ability to process streaming data enables the low-rank approximation to be updated with new information without having to review the entire original data set. For example, a new row or column may be added to the input matrix and the corresponding sketch may be updated based on only the new row or column and the previously generated sketch.

The matrix sketching process builds a sketch matrix B by filling the matrix with new data points (e.g., columns) from an input matrix A until the l columns of B are full, and then decrementing the B matrix (e.g., compacting) to make new space available for additional data points. Decrementing the matrix B does require an SVD operation; however, the SVD operation is performed on matrix B, which is substantially smaller than matrix A. FIG. 1A illustrates an example of a matrix sketching process 100A to generate a sketch B of an input matrix A. The matrix sketching process 100A may be performed, for example, by a special purpose computer system as described further below with respect to FIG. 9.

In act 102, the system determines whether there is new data to incorporate into the sketch B. If there is not any new data to add to the sketch B, the process 100A ends. Otherwise, the system proceeds to act 104 and determines whether the sketch B is full (e.g., the l columns in matrix B are full). If the matrix B is not full, the system proceeds to act 112 and adds the new data point to an available column in B. Otherwise, the system decrements the matrix B in act 114 to make a column available and adds the new data point to the available column in act 112.

The system may decrement the matrix B in act 114 by performing a series of steps as illustrated by acts 106, 108, and 110 in process 100A. In act 106, the system updates the SVD of matrix B to yield a U matrix, a $\Sigma$ matrix, and a V matrix. As discussed above, performing SVD on a matrix reorganizes the information in the matrix. For example, multiplying the U matrix by the $\Sigma$ matrix (e.g., to produce a U$\Sigma$ matrix) may reorganize the columns such that the columns are in descending order from most energy to least energy. An SVD update operation is employed in act 106 to generate new U, $\Sigma$, V matrices that incorporate the most recently added data point based on the U, $\Sigma$, V matrices from the previous iteration and the latest data point. As described in more detail below with reference to FIGS. 3 and 4, various SVD update operations may be employed in act 106 that offer a reduced computational complexity relative to determining the full SVD of matrix B in each iteration by, for example, QR decomposition.

In act 108, the system determines the norm squared, $\delta$, of the last column in the reorganized matrix (i.e., the column with the least amount of energy) and proceeds to act 110 to subtract $\delta$ from all of the columns in matrix B. Thereby, the last column in the matrix B is zeroed and the values in the remaining columns are reduced by $\delta$.

Figure 2:
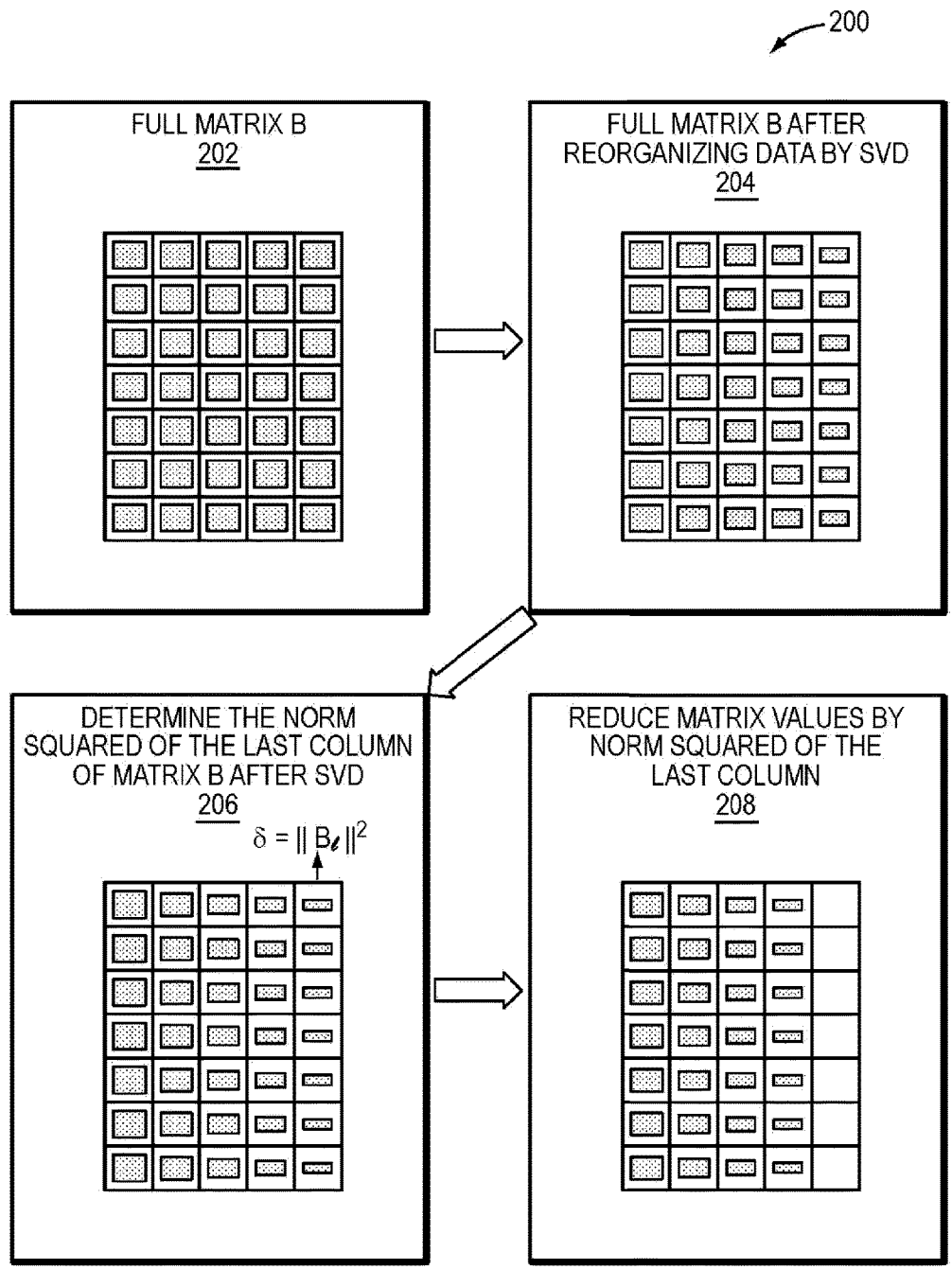
FIG. 2 is a pictorial representation of a process of decrementing a matrix.

FIG. 2 provides a pictorial representation 200 of the decrement step 114 described in process 100A. The pictorial representation 200 illustrates a full matrix B in the first state 202 that needs to decremented. The second state 204 illustrates the matrix B after being reorganized by SVD in act 106 described above. The size of the box within each matrix position illustrates the reorganization of the columns from most energy to least energy from left to right. The third state 206 illustrates the determination of the norm squared $\delta$ of the last column (e.g., the column with the least energy) in act 108. Subtracting the norm squared $\delta$ of the last column from each of the columns in act 110 yields the matrix B illustrated in the fourth state 208. The matrix B in the fourth state 208 now has an available column for new data to be added in act 112.

Figure 1B:
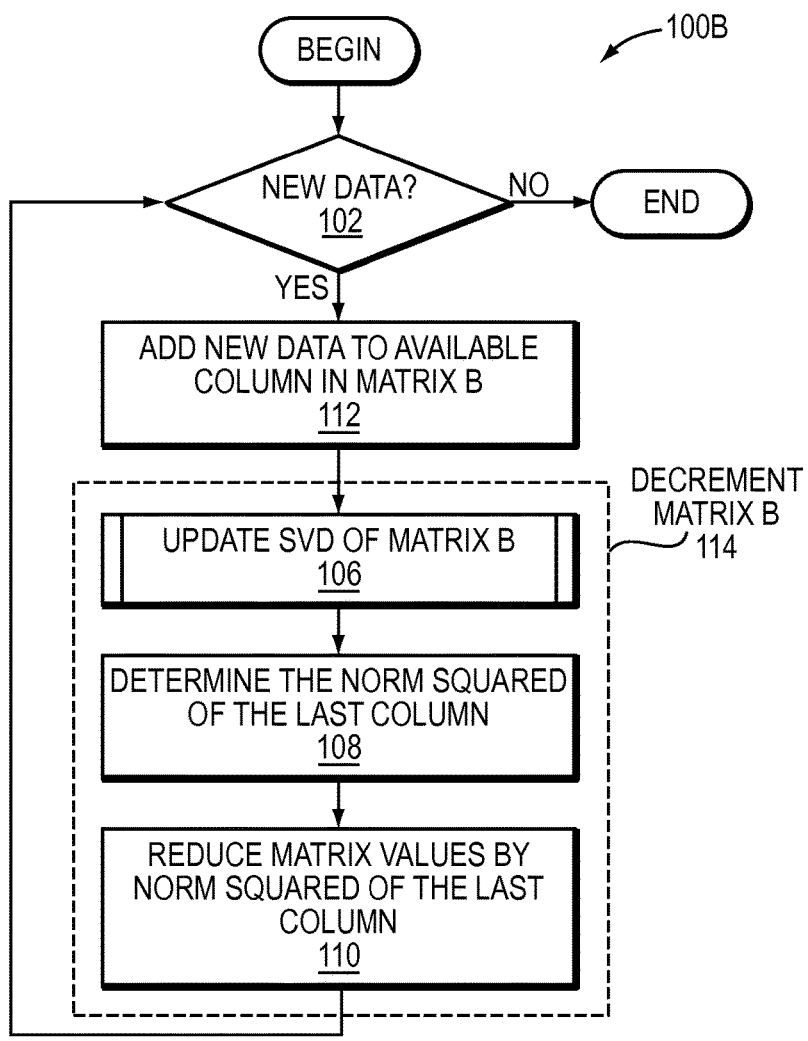

It is appreciated that various alterations may be made to process 100A to generate a sketch B of a matrix. For example, as illustrated by process 100B in FIG. 1B, the act 114 of decrementing the sketch B may be performed after adding a new data point to the sketch B. In this approach, the matrix B is compacted after adding the new data point (as opposed to before). In addition, the matrix sketching processes 100A and 100B can be expanded to incorporate batches of new data points as opposed to a single data point (e.g., a single column or row) at a time. For example, the system may determine the norm square $\delta$ of the median column of B (as opposed to the last column or row of B). Thereby, the system zeroes l/2 columns in each iteration as opposed to a single column. The system may then add l/2 data points into the sketch B before performing another matrix decrement. Processing data in batches reduces the asymptotic runtime by a factor of l at the cost of O(cl) additional memory where c is the number of additional data points being included in the batch (e.g., c is 2 for a batch of 3).

The sketching processes described above yields low-rank approximations of a given matrix A for a lesser computational complexity relative to generating $A_k$ by performing SVD on the entire matrix A (e.g., $O(nm^2)$). In addition, the computational complexity is further reduced relative to other matrix sketching processes by employing an SVD update to incorporate the new data entry in act 106 as opposed to performing SVD of the full matrix B. For illustration, a matrix sketching procedure employing a full SVD of matrix B in each iteration is illustrated below in Procedure 1 that receives an n by m matrix A and a desired number of rows l in the output sketch B.

Procedure 1

Input: l, $A \in \mathbb{R}^{n \times m}$
1: B←empty matrix $\in \mathbb{R}^{l \times m}$
2: for $i \in [n]$ do
3: Set $B_+ \leftarrow B^{i-1}$ with the last row replaced with $A_i$
4: [U, $\Sigma$, V]←SVD($B_+$)
5: $\delta \leftarrow \sigma_l^2$
6: $\check{\Sigma} \leftarrow \sqrt{\max(\Sigma^2 - 1_l \delta, 0)}$
7: $B^i \leftarrow \check{\Sigma} V^T$
8: end for
Return: $B^i$ As illustrated in Procedure 1, the system defines a sketch matrix B as an l by m matrix in step 1. The system proceeds through a loop in steps 2-8 incorporating data from A into the sketch B one entry (e.g., row) at a time. In step 3, the last row of matrix B (from the previous iteration) is replaced with $A_i$. Note that the last row of matrix B is already zeroed from the decrement process performed by steps 4-7 (for the second and any subsequent iterations). In the decrement process, the system determines the SVD of B (at the current iteration), determines the square of the norm of the last row, and subtracts the determined norm square value from all of the rows. The resulting time complexity of Procedure 1 is $O(nml^2)$, which can be reduced by updating an existing SVD of matrix B in each iteration consistent with processes 100A and 100B as discussed in more detail below.

SVD Update in Matrix Sketching

SVD updating techniques may be applied to an existing SVD of a matrix to reflect various changes to the matrix including, for example, incorporating new rows or columns, editing various entries, and applying shifts to the entries. These SVD update operations may be less computationally intensive than determining a new SVD of the modified input matrix.

The sketching Procedure 1 described above computes a new SVD in each iteration with a revised B matrix incorporating one or more additional rows relative to the previously computed SVD. As discussed in more detail below, the SVD of the previous iteration may be updated by incorporating the new data into the previous SVD. The new information to incorporate into the matrix B may be represented as b and the new SVD may be presented by equation (6) below.

$$U^b \Sigma^b (V^b)^T = \begin{bmatrix} B \\ b \end{bmatrix} \quad (6)$$

Figure 3:
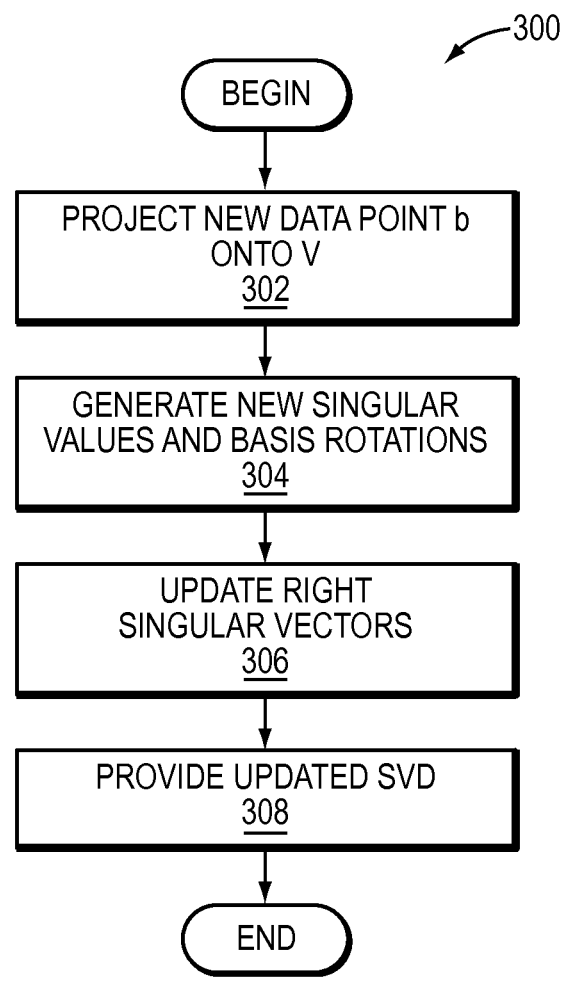
FIG. 3 is a flow diagram of an example incremental singular value decomposition (SVD) update process.

In at least some matrix sketching examples, only the $\Sigma^b$ and $V^b$ are needed from the SVD of matrix B. Consequently, a tailored SVD update process 300 as illustrated in FIG. 3 may be employed to update the requisite values in, for example, act 106 of process 100A and/or 100B.

In act 302, the system projects the new data point b onto the right singular vectors V (an orthonormal basis of $\mathbb{R}^m$) of the previous SVD of B. The projection of b onto V yields q as illustrated below in equation (7).

$$q = bV \qquad (7)$$

In act 304, the system generates the new singular values and basis rotations. The system may generate the new singular values and basis rotations by appending q to the bottom of $\Sigma$ (from the previous SVD of B) and determining the SVD of the resulting matrix as illustrated in equation (8) below.

$$SVD\left(\begin{bmatrix} \Sigma \\ q \end{bmatrix}\right) = \check{U}\check{\Sigma}\check{V}^T \qquad (8)$$

In act 306, the system updates the right singular vectors. The system may update the right singular vectors by determining a product between the V matrix from the previous SVD and the new $\check{V}$ matrix generated in act 304 above as illustrated in equation (9) below.

$$V^{rot} = V\check{V} \qquad (9)$$

In act 308, the system provides the updated SVD. The updated SVD may include, for example, an updated $\Sigma$ matrix $\Sigma^b$ and an updated V matrix $V^b$. The matrices $\Sigma^b$ and $V^b$ may be provided based on previously computed values as illustrated below in equations (10) and (11).

$$\Sigma^b = \check{\Sigma} \qquad (10)$$

$$V^b = V^{rot} \qquad (11)$$

Incorporating the SVD update as described above in FIG. 3 into Procedure 1 yields the following procedure illustrated in Procedure 2.

Procedure 2

Input: l, $A \in \mathbb{R}^{n \times m}$
1: $\Sigma \leftarrow$ empty matrix $\in \mathbb{R}^{l-1 \times m}$
2: $V \leftarrow I_m$
3: for $i \in [n]$ do
4: Set $q \leftarrow A_i V$ {$A_i$ is the ith row of A}
5: Set the last row of $\Sigma$ to q
6: $[\check{U}, \check{\Sigma}, \check{V}] \leftarrow SVD(\Sigma)$
7: $V \leftarrow V\check{V}$
8: $\delta \leftarrow \sigma_l^2$
9: $\Sigma \leftarrow \sqrt{\max(\check{\Sigma}^2 - I_l \delta, 0)}$
10: end for
Return: $B = \Sigma V^T$ As illustrated above, steps 3 and 4 in Procedure 1 of setting up and calculating the SVD of the modified B matrix are replaced with the incremental SVD update in steps 4-7 in Procedure 2. The high complexity steps in performing the SVD update in Procedure 2 include the SVD of the $\Sigma$ matrix in step 6 (and act 304) and the matrix multiplication of $V\check{V}$ in step 7 (and act 306). The SVD operation in step 6 is of an $O(ml^2)$ computational complexity because the matrix σ in step 6 is an l×m matrix, similar to Procedure 1. The matrix multiplication operation in step 7 also has an $O(ml^2)$ complexity yielding an overall computational complexity of $O(nml^2)$.

Figure 4:
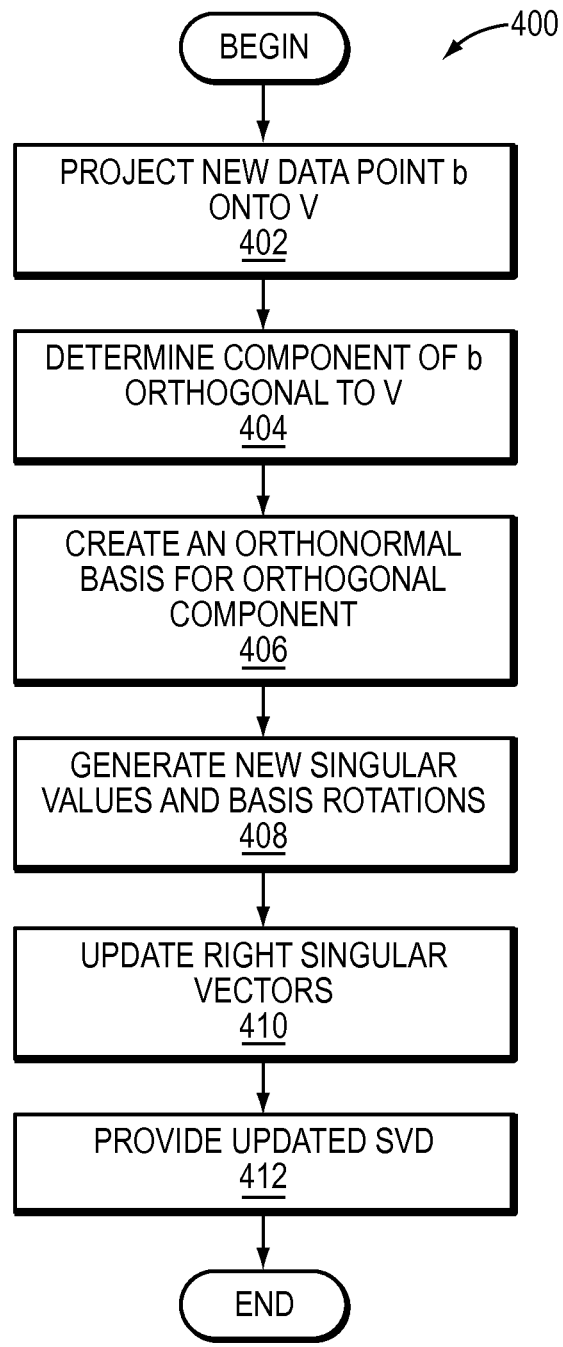
FIG. 4 is a flow diagram of an example truncated incremental SVD update process.

In at least one example, the SVD update step may be truncated to reduce computational complexity. FIG. 4 illustrates such an example of a truncated SVD update process 400 to be performed in, for example, act 106 of process 100A or 100B described above.

Referring to FIG. 4, in act 402, the system projects the new data point b onto the right singular vectors (V), which is an orthonormal basis of $R^m$ generated by the previous SVD of B. The projection of b onto V yields g as illustrated below in equation (12).

$$g = bV \qquad (12)$$

In act 404, the system determines the component g of the new point b that is orthogonal to V. The orthogonal component may be represented as q and determined consistent with equation 13 below.

$$q = b^T - (Vg^T) \qquad (13)$$

In act 406, the system creates an orthonormal basis for the orthogonal component q as illustrated below in equations 14 and 15.

$$R_b = \|q\| \qquad (14)$$

$$Q = R_b^{-1} q \qquad (15)$$

In act 408, the system generates the new singular values and basis rotations. The system may determine the new singular values and basis rotations by combining the singular values, the orthogonal basis $R_b$, and the projection g into a single matrix and determining the SVD of the resulting matrix as illustrated below in equation 16.

$$SVD\left(\begin{bmatrix} \Sigma & 0 \\ g & R_b \end{bmatrix}\right) = \check{U}\check{\Sigma}\check{V} \qquad (16)$$

In act 410, the system updates the right singular vectors. The system may update the right singular vectors by determining a product between the right singular vectors from the new SVD ($\check{V}$) and a combination of Q and the right singular vectors from the previous SVD (V) as illustrated in equation (17) below.

$$V^{rot} = [V\ Q]\check{V} \qquad (17)$$

In act 412, the system provides the updated SVD. The updated SVD may include, for example, an updated $\Sigma$ matrix $\Sigma^b$ and an updated V matrix $V^b$. The matrices $\Sigma^b$ and $V^b$ may be provided based on previously computed values as illustrated below in equations (18) and (19).

$$\Sigma^b = \check{\Sigma} \qquad (18)$$

$$V^b = V^{rot} \qquad (19)$$

Incorporating the truncated SVD update as described above and with reference to FIG. 4 into Procedure 1 yields the following procedure referred to as Procedure 3.

Procedure 3

Input: l, $A \in \mathbb{R}^{n \times m}$
1: $\Sigma \leftarrow$ empty matrix $\in \mathbb{R}^{l \times m}$
2: $V \leftarrow$ first l columns of $I_m$
3: for $i \in [n]$ do
4: Set $g \leftarrow A_i V$ {$A_i$ is the ith row of A}

5: Set $q \leftarrow A_i^T - (Vg^T)$
6: Set $R_b \leftarrow \|q\|$
7: Set $Q \leftarrow R_b^{-1} q$ 8. $[\breve{U}, \breve{\Sigma}, \breve{V}] \leftarrow SVD\left(\begin{bmatrix} \Sigma & 0 \\ g & R_b \end{bmatrix}\right)$ 9: $V \leftarrow [V\ Q]\breve{V}$
10: $\delta \leftarrow \sigma_l^2$
11: $\Sigma \leftarrow \sqrt{\max(\Sigma^2 - I_l \delta, 0)}$
12: end for
Return: $B = \Sigma V^T$ As illustrated above, steps 3 and 4 in Procedure 1 of setting up and calculating the SVD of the modified B matrix are replaced with the incremental SVD update in steps 4-9 in Procedure 3. The incremental SVD update offers a performance improvement relative to Procedure 1 by performing an SVD operation on a smaller l by l matrix as opposed to the larger l by m matrix in step 4 of Procedure 1. In addition, the l by l matrix that is decomposed in step 8 may exhibit a broken arrowhead structure (e.g., matrices with non-zero values only along the diagonal and in the last row or rows) that enables the application of specialized SVD procedures that require less runtime. For example, the runtime complexity of determining the SVD of an l by l matrix without any unique structure may be $O(l^3)$ while the runtime complexity of determining the SVD of an l by l matrix exhibiting a broken arrowhead structure may be $O(l^2)$. Thereby, the rate limiting step in Procedure 3 is the matrix multiplication in step 9 that may be easily parallelized, unlike the SVD operation in step 4 of Procedure 1. The performance improvement of Procedure 3 relative to Procedure 1 is illustrated below with reference to FIGS. 5A-5C.

Matrix Sketching Experimental Results

Figure 5A:
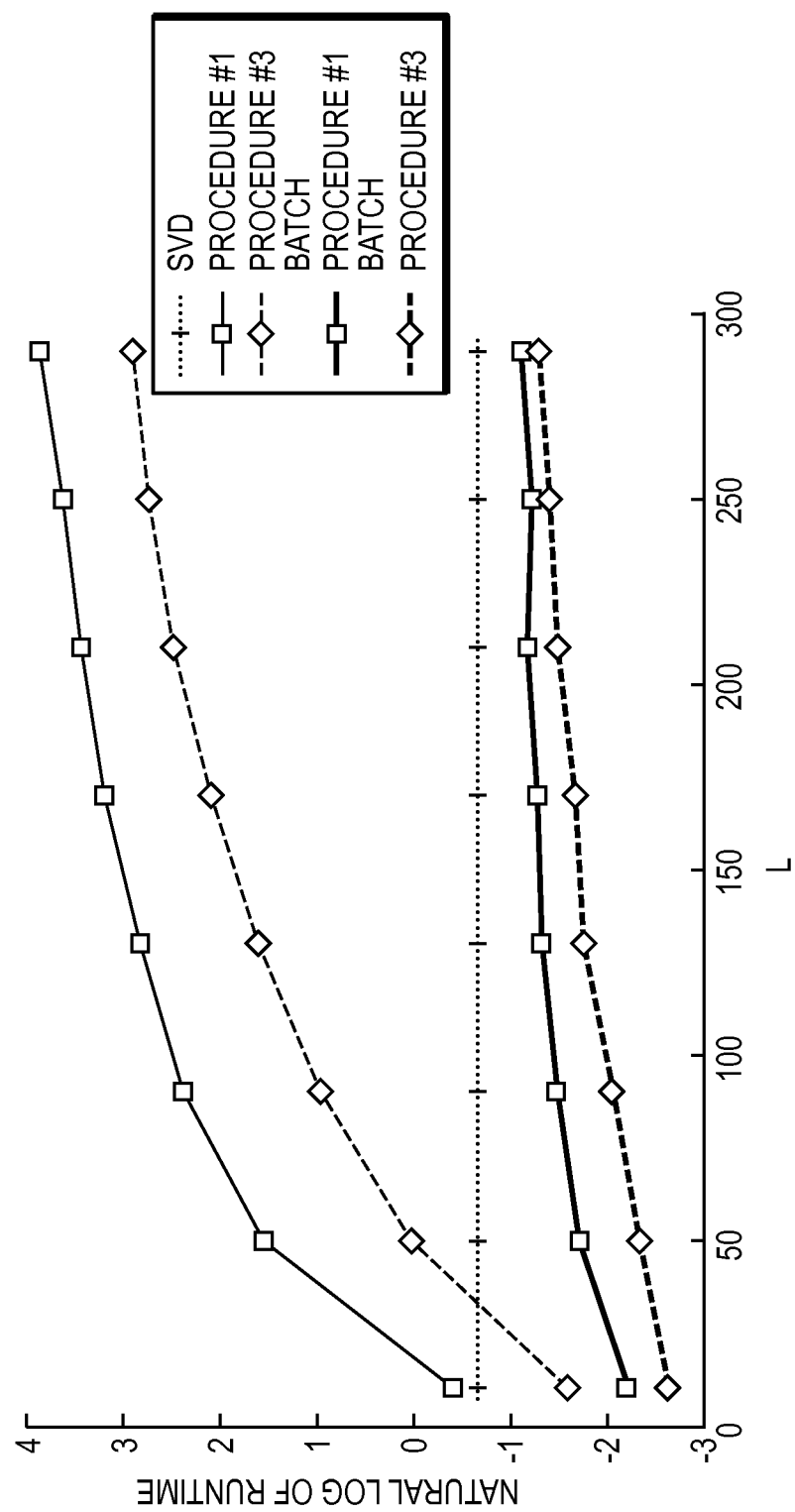
FIG. 5A is a graph illustrating the runtime of various matrix approximation processes.

As discussed above, various matrix sketching techniques according to certain examples reduce the computational complexity of determining a low-rank approximation of a given matrix A. FIG. 5A illustrates a comparison of runtimes of the various techniques to generate a low-rank approximation based on a synthetic data set with linearly decreasing singular values in a 1000×1000 matrix. The tests were performed on an Intel Core i5-3470 central processing unit operating at 3.2 GHz. In particular, the performance of generating a rank l matrix $A_k$ by SVD of the entire A matrix was compared with Procedure 1 and Procedure 3 in both single data point and batch data point forms as described above.

As illustrated in FIG. 5A, the performance of the SVD approach is constant across all values of l. As described above, the approximation $A_k$ is formed by determining the SVD of the entire matrix A and selecting particular rows and columns. Accordingly, the runtime to generate an approximation $A_k$ is relatively constant regardless of the desired rank of the approximation $A_k$. The performance of Procedure 1 while processing data entries in batches outperformed the SVD approach across all values of l illustrated. Procedure 3 substitutes the SVD operation of B for a truncated SVD update and, thereby, reduces the computational complexity and improves runtime. Thereby, Procedure 3 outperforms the respective version of Procedure 1, as shown in FIG. 5A.

Figure 5B:
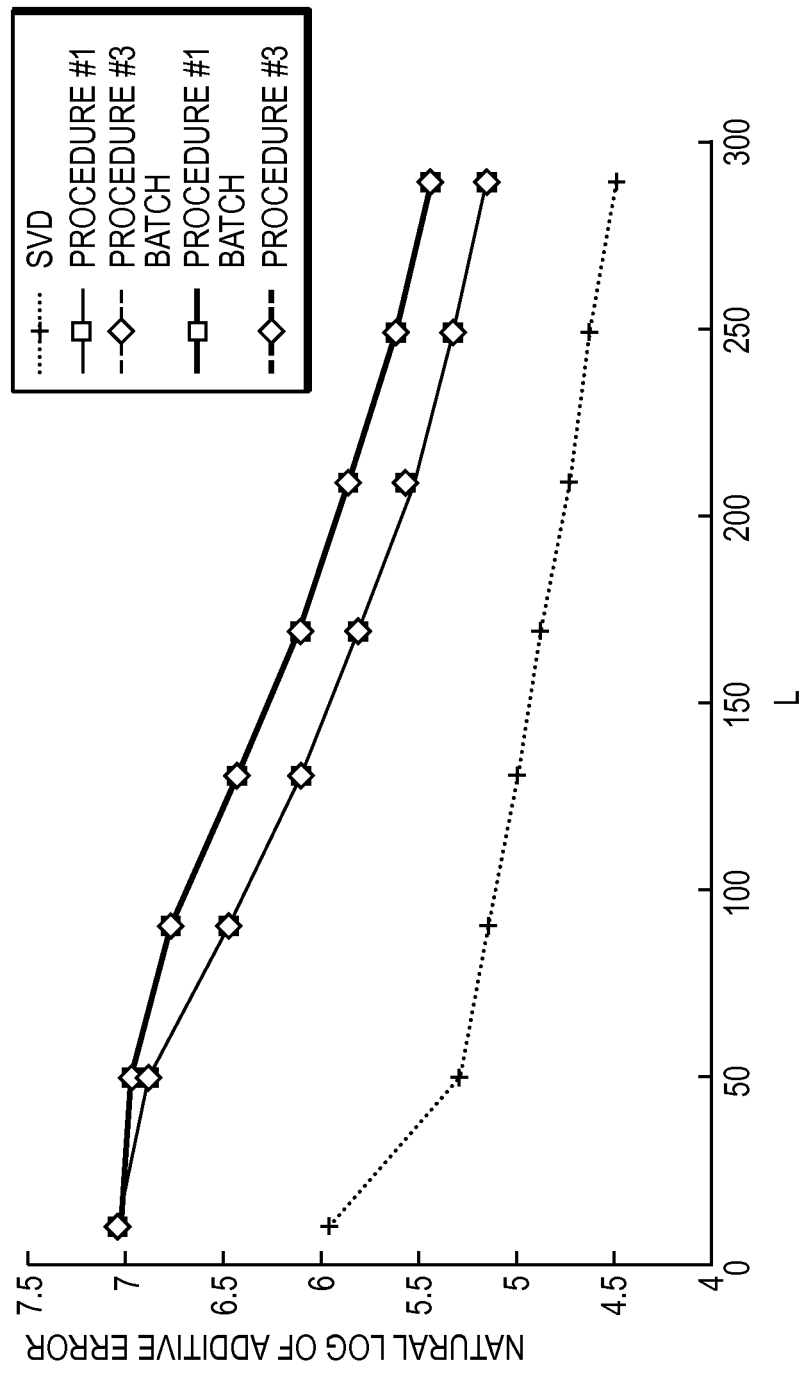
FIG. 5B is a graph illustrating the additive error of various matrix approximation processes.

FIG. 5B illustrates a comparison of the additive error introduced by the various low-rank approximation techniques. The additive error may be represented by equation 20 below.

$$\|A^T A - B^T B\| \quad (20)$$

As illustrated in FIG. 5B, the additive error is lowest for SVD followed by matrix sketching Procedures 1 and 3. Note that the substitution of the SVD update step in Procedure 1 to form Procedure 3 yields the same additive error (even in the batch case).

Figure 5C:
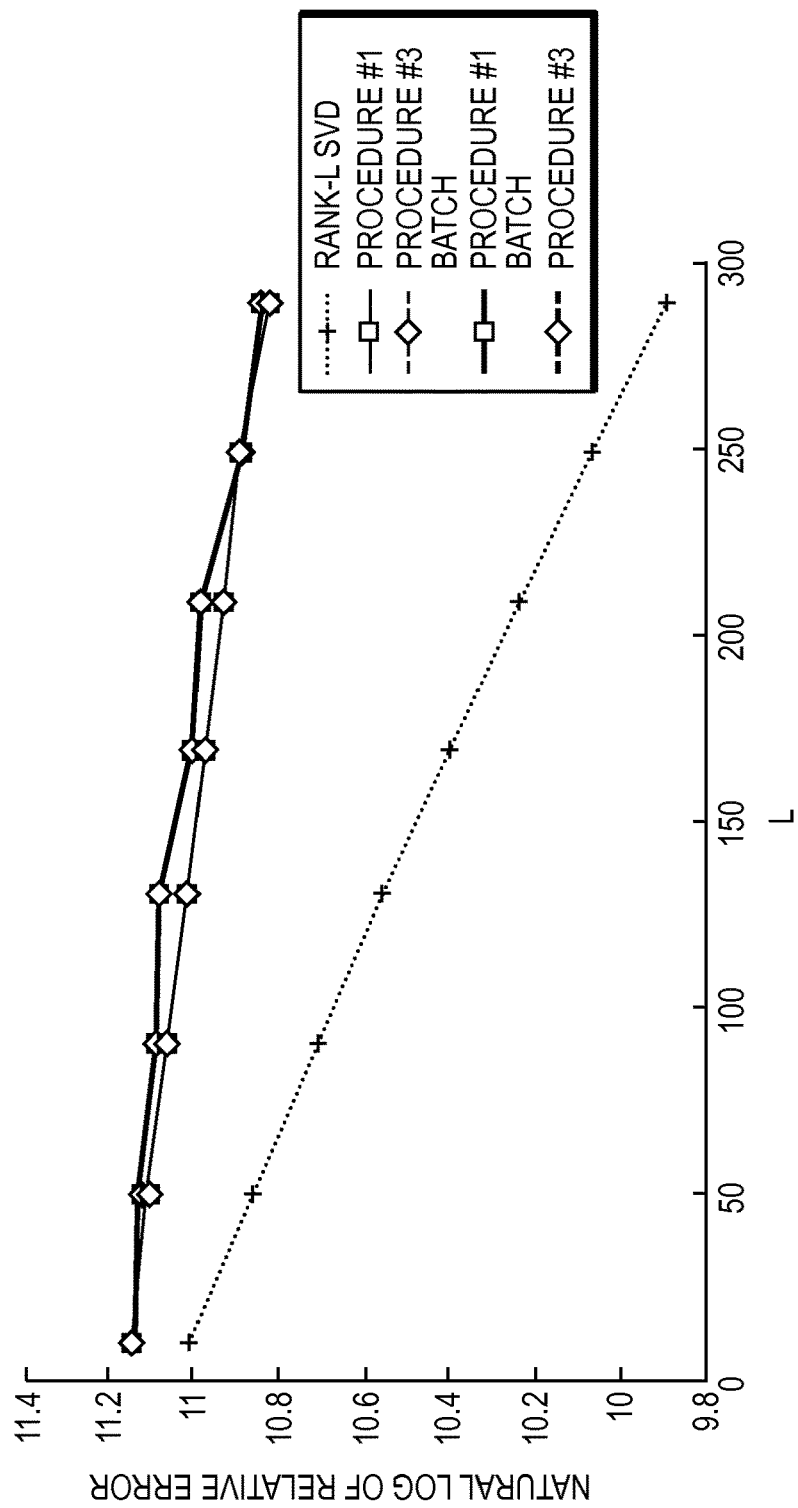
FIG. 5C is a graph illustrating the relative error of various matrix approximation processes.

FIG. 5C illustrates a comparison of the relative error introduced by the various low-rank approximation techniques. The relative error may be represented by equation 21 below.

$$\|A\|_F^2 - \|B\|_F^2 \quad (21)$$

Similar to the additive error illustrated above, the SVD approach yielded the lowest error followed by matrix sketching Procedures 1 and 3. Note that, again, the substitution of the SVD update step in Procedure 1 to form Procedure 3 yields the same relative error (even in the batch case).

As illustrated by FIGS. 5A-5C, matrix sketching processes can offer substantial performance improvements relative to other matrix approximation approaches. Further, the substitution of an SVD update in the matrix sketching processes in place of a full SVD operation offers performance improvements without the introduction of any substantial additive or relative error. The performance improvements achieved through the use of these techniques can be implemented by themselves to enable computer systems to more efficiently process and store large data sets, a problem that is unique to modern computer systems. In addition, these techniques may be applied to other fields including, for example, latent semantic indexing to improve reduce the time required to search and retrieve relevant documents.

Sketching in Latent Semantic Indexing

Latent Semantic Indexing (LSI) is a modified approach to standard vector-space information retrieval. In both approaches, a set of m documents is represented by m individual n by 1 vectors in an n by m term-document matrix A. The elements of each vector represent the frequency of a specific word in that document. For example, element $A_{i,j}$ is the frequency of word i in document j. The frequencies in the term-document matrix are often weighted locally, within a document, and/or globally, across all documents, to alter the importance of terms within or across documents. Using vector-space retrieval, a query is represented in the same fashion as a document, as a weighted n by 1 vector. The execution of the look-up of a query q is performed by mapping the query onto the row-space of the term-document matrix A to obtain relevancy scores w between the query and each document. The relationship between the vector of relevancy scores w to q and A is illustrated below in equation (22) below.

$$w = q^T A \quad (22)$$

The index of the highest score in w is the index of the document in A that most closely matches the query, and a full index-tracking sort of w returns the documents in order of relevancy to the query as determined by directly matching terms of the query and the documents.

Vector-space retrieval has numerous drawbacks. It can often return inaccurate results due to synonymy and polysemy. Synonymy is the issue of concepts being described in different terms, resulting in queries not matching appropriate documents discussing the same concepts due to word choice. Polysemy is the problem of single words having multiple meanings. Such words can lead to documents being returned with high relevancy scores when in fact they share little to no conceptual content with the query. Vector-space retrieval also requires the persistent storage of the matrix A. As information retrieval is often performed on extremely large data sets, storing A is often undesirable.

LSI uses a rank-k approximation of A to try to overcome the issues of synonymy, polysemy, and storage. The concept behind LSI is that the matrix $A_k$ will reveal some latent semantic structure that more accurately matches queries to documents based on shared concepts rather than words. The query matching process in LSI is nearly identically to vector-space retrieval with the replacement of the term-document matrix.

$$\hat{w} = q^T A_k \qquad (23)$$

$$A_k = U_k \Sigma_k V_k^T \qquad (24)$$

As discussed above, computing $A_k$ by SVD methods may be prohibitively computationally expensive. The sketching techniques described above, however, may be employed to generate an approximation of $A_k$ and reduce the complexity. Further, the sketching methods are streaming, enabling new data to easily be incorporated into a revised sketch of A. The sketch of A may be easily employed to construct an approximation of $A_k$ on demand.

Figure 6:
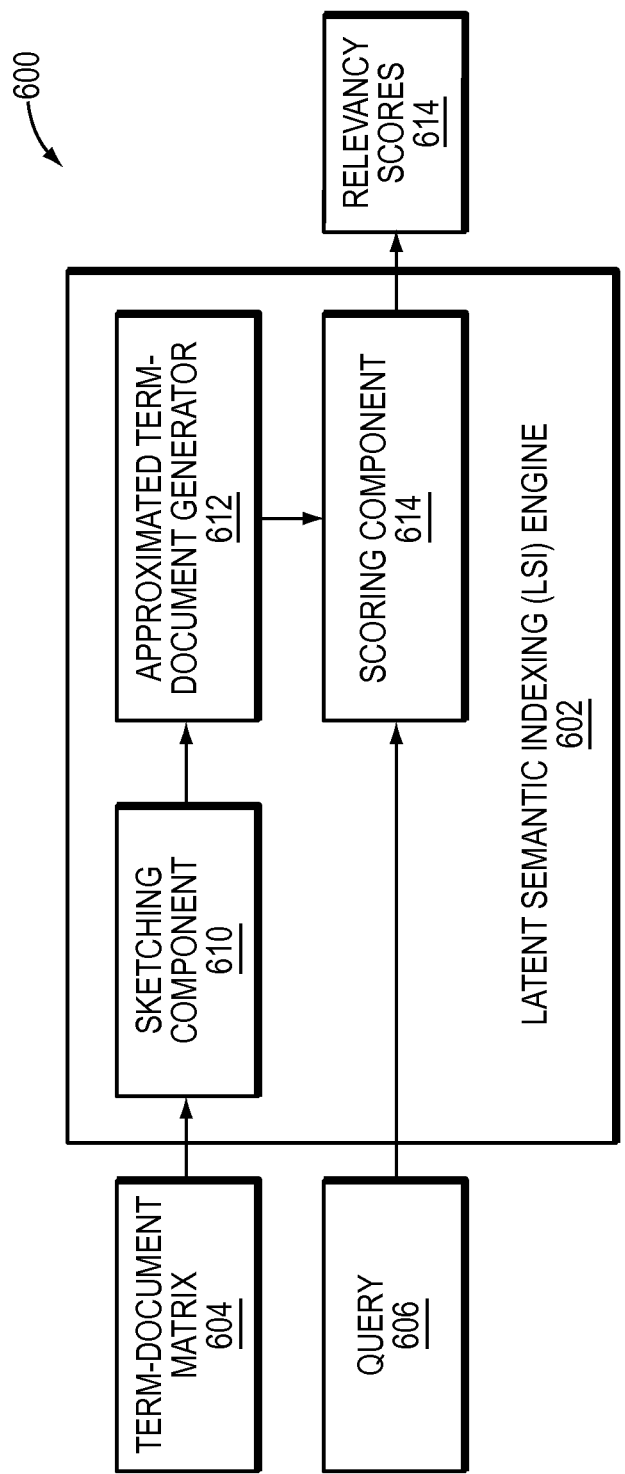
FIG. 6 is a diagram of an example system for latent semantic indexing (LSI)
Figure 7:
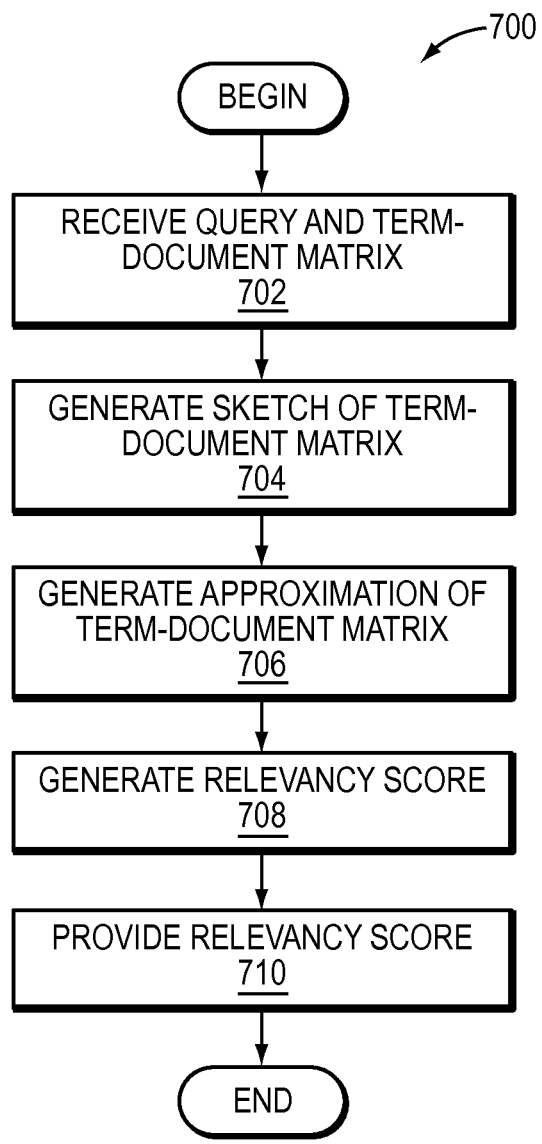
FIG. 7 is a flow diagram of an example LSI process.

FIG. 6 illustrates an example LSI system 600 including an LSI engine 602 configured to receive a term document matrix 604 in addition to a query 606 and generate relevancy scores 608. The LSI engine includes a sketching component 610 to generate a sketch consistent with various techniques described herein of the term-document matrix 604. The LSI engine further includes an approximated term-document generate to generate an approximation of $A_k$ of the term-document matrix based on the sketch generated by the sketching component. The query 606 is applied to the approximation of $A_k$ by the scoring component 614 of the LSI engine 602. The scoring component 614 generates the relevancy scores 608. FIG. 7 illustrates an example method of LSI 700 to generate relevancy scores based on a term-document matrix and a query that may be performed by, for example, the LSI system 600.

In act 702, the system receives a term-document matrix and a query to search in the term-document matrix. The system may receive the full term-document matrix and/or relevant updates to the term-document matrix that may be combined with a stored term-document matrix and/or employed by the sketch component to generate an updated sketch.

In act 704, the system generates a sketch of the term-document matrix. The system may employ any one or a combination of the techniques described in Procedures 1, 2, and 3 to generate the sketch.

In act 706, the system generates an approximation of the term-document matrix. The approximation of the term-document matrix may be, for example, a rank k approximation of the term-document matrix based on the previously generated sketch.

The system applies the query to the approximation of the term-document matrix to generate a relevancy score in act 708, and provides the relevancy score in act 710.

As described above, various sketching techniques may be incorporated into an LSI engine to reduce the computational complexity of generating an approximation of the term-document matrix. Procedure 4 below illustrates an example Procedure to convert a matrix A into a sketch and construct an approximation of $A_k$ from the sketch.

Procedure 4

Input: l, k, $A \in \mathbb{R}^{n \times m}$
1: B←sketch(A) where $\in \mathbb{R}^{l \times m}$
2: $S \leftarrow BB^T$
3: $[U, \Sigma, V] \leftarrow SVD(S)$
4: for i=1, ..., k do
5: $\hat{\sigma}_t = \sqrt{\sigma_t}$
6: $\hat{v}_t = Bu_t/\hat{\sigma}_t$
7: end for
8: $\hat{U}_k = A\hat{V}_k \hat{\Sigma}_k^+$ {$\hat{\Sigma}_k^+$ is the pseudoinverse of $\hat{\Sigma}_k$}
Return: $\hat{U}_k, \hat{\Sigma}_k, \hat{V}_k$ Procedure 4 receives the term-document matrix A, a desired sketch dimension l, and a desired rank k of the approximation of $A_k$. In step 1, a sketch B is generated of the matrix A consistent with various techniques described above in Procedures 1, 2, or 3. Steps 2-7 generate the requisite right singular vectors $\hat{v}_t$ and singular values $\hat{\sigma}_t$ to form the $\hat{V}_k$ and $\hat{\Sigma}_k$ matrices for approximation of $A_k$ ($\hat{A}_k$). In step 8, the matrix $\hat{U}_k$ is determined based on A, the matrix $\hat{V}_k$, and a pseudo inverse of the $\hat{\Sigma}_k$ matrix. The pseudo inverse of the $\hat{\Sigma}_k$ matrix may be formed by replacing every non-zero diagonal entry with its reciprocal and transposing the resulting matrix.

Latent Semantic Indexing Experimental Results

Figure 8A:
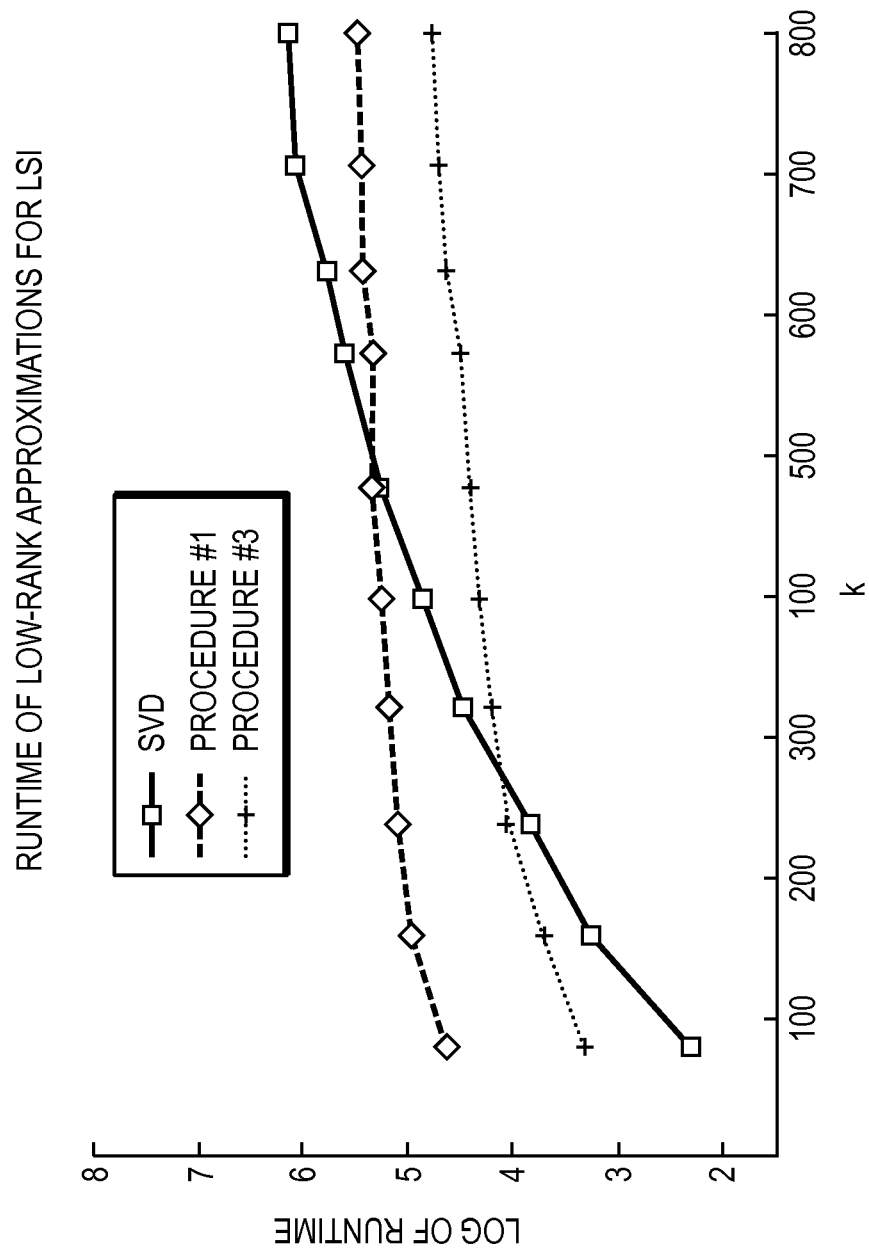
FIG. 8A is a graph illustrating the runtime of various LSI processes.

As discussed above, various matrix sketching techniques may be applied to LSI reduce the computational complexity of determining low-rank approximations of $A_k$ to apply a query. FIG. 8A illustrates a comparison of runtimes of the various techniques to generate a low-rank approximation $A_k$ of a term-document matrix illustrating the frequencies of 7491 terms across 11,429 documents and apply the query to the low-rank approximation $A_k$. The runtimes were measured on an Intel Core i5-3470 central processing unit operating at 3.2 GHz.

As illustrated by FIG. 8A, generating a sketch of the term-document matrix consistent with the matrix sketching approach in Procedures 1 and 3 offers a considerable reduction in runtime for larger values of k. In particular, Procedure 3 offers a substantial performance improvement relative to SVD for larger values of k.

Figure 8B:
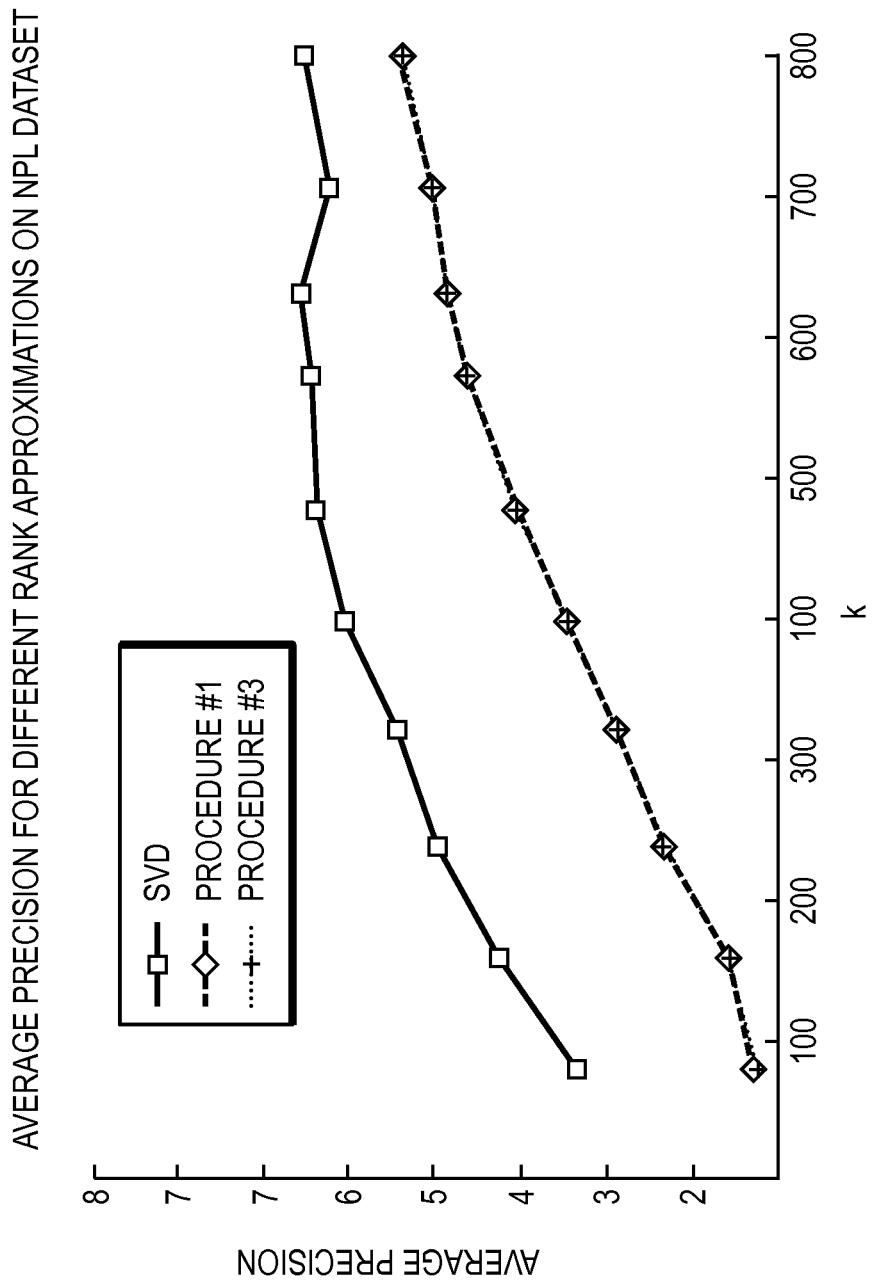
FIG. 8B is a graph illustrate the average precision of various LSI processes.

FIG. 8B illustrates the average precision of the various LSI techniques. The average precision may be measured by the dividing the number of correct documents returns by the number of documents returned. The SVD approach yields the highest average precision followed by Procedure 1 and Procedure 3. Note that substituting the SVD operation in Procedure 1 for an SVD update operation in Procedure 3 did not reduce the average precision.

It is appreciated that the performance improvements achieved in LSI may be similarly achieved in other applications involving the receipt and processing of large data sets including, for example, image processing. These techniques improve the performance of any device or computer system constructed to perform these processing tasks by reducing the computational complexity to generate a compact representation of a given matrix A with minimal, if any, introduction of error relative to other methods and/or reducing the required memory footprint.

Special Purpose Computer System

The low-rank approximation techniques described herein may be implemented on various special purpose computer systems designed to receive and/or process large data sets. These techniques improve the operation of the special purpose computer system by reducing the computation complexity of generating approximations of large data sets (see, e.g., FIGS. 5A and 8A above) relative to other methods. Further, the low-rank approximation techniques according to certain examples reduce the memory footprint required to store the data by creating a concise representation of the data that can be updated as new data arrives. Thereby, the special purpose computer can process the same information in less time, using less power, and generating less heat.

Figure 9:
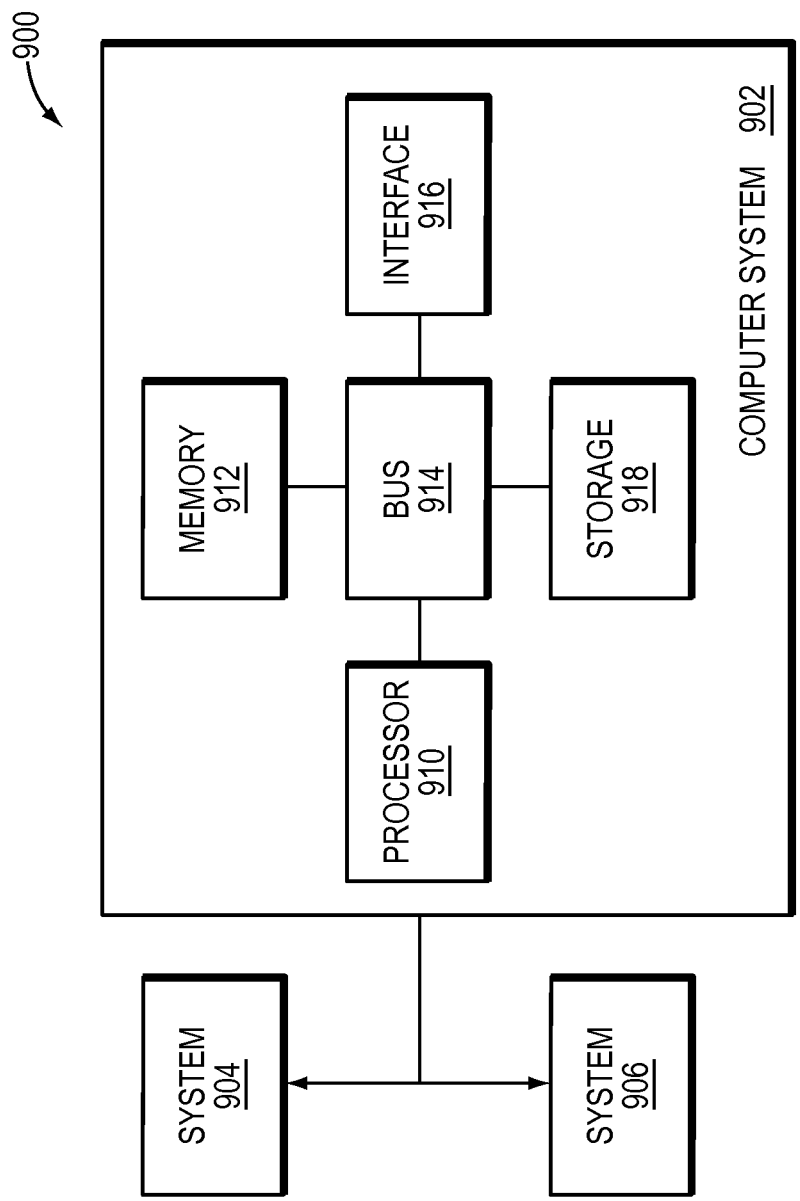
FIG. 9 is a block diagram of an example special purpose computer system.

FIG. 9 shows a block diagram of a distributed computer system 900, in which various aspects and functions in accord with the present invention may be practiced. The distributed computer system 900 may include one more computer systems that can be specially configured to perform the functions, operations, and/or processes disclosed herein (e.g., generating low-rank matrix approximations). For example, as illustrated, the distributed computer system 900 includes three computer systems 902, 904 and 906. As shown, the computer systems 902, 904 and 906 are interconnected by, and may exchange data through, a communication network 908. The network 908 may include any communication network through which computer systems may exchange data. To exchange data via the network 908, the computer systems 902, 904, and 906 and the network 908 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM and Web Services.

Various aspects and functions in accord with the present invention may be implemented as specialized hardware or software executing in one or more computer systems including the computer system 902 shown in FIG. 9. As depicted, the computer system 902 includes a processor 910, a memory 912, a bus 914, an interface 916 and a storage system 918. The processor 910, which may include one or more microprocessors or other types of controllers, can perform a series of instructions that manipulate data. The processor 910 may be, for example, a commercially available processor or controller. As shown, the processor 910 is connected to other system placements, including a memory 912, by the bus 914.

The memory 912 may be used for storing programs and data during operation of the computer system 902. For example, the memory 912 may store one or more generated sketches of the received data. Thus, the memory 912 may be a relatively high performance, volatile, random access memory such as a dynamic random access memory (DRAM) or static memory (SRAM). However, the memory 912 may include any device for storing data, such as a disk drive or other non-volatile storage device, such as flash memory or phase-change memory (PCM).

Components of the computer system 902 may be coupled by an interconnection element such as the bus 914. The bus 914 may include one or more physical busses (for example, busses between components that are integrated within a same machine), and may include any communication coupling between system placements including specialized or standard computing bus technologies. Thus, the bus 914 enables communications (for example, data and instructions) to be exchanged between system components of the computer system 902.

Computer system 902 also includes one or more interfaces 916 such as input devices, output devices and combination input/output devices. The interface devices 916 may receive input, provide output, or both. For example, output devices may render information for external presentation. Input devices may accept information from external sources. The interface devices 916 allow the computer system 902 to exchange information and communicate with external entities, such as users and other systems.

Storage system 918 may include a computer-readable and computer-writeable nonvolatile storage medium in which instructions are stored that define a program to be executed by the processor. The instructions may be persistently stored as encoded signals, and the instructions may cause a processor to perform any of the functions described herein. A medium that can be used with various examples may include, for example, optical disk, magnetic disk or flash memory, among others. In operation, the processor 910 or some other controller may cause data to be read from the nonvolatile recording medium into another memory, such as the memory 912, that allows for faster access to the information by the processor 910 than does the storage medium included in the storage system 918. The memory may be located in the storage system 918 or in the memory 912. The processor 910 may manipulate the data within the memory 912, and then copy the data to the medium associated with the storage system 918 after processing is completed.

Various aspects and functions in accord with the present invention may be practiced on one or more computers having different architectures or components than that shown in FIG. 9. For instance, the computer system 902 may include specially-programmed, special-purpose hardware, such as for example, an application-specific integrated circuit (ASIC) tailored to perform a particular operation disclosed herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A system for generating a low-rank approximation of a matrix, the system comprising:
   a memory;
   at least one processor coupled to the memory;
   a sketching component executable by the at least one processor and configured to:
     receive the matrix and at least one desired dimension of the low-rank approximation, the matrix including a plurality of data entries;
     selecting a subset of the matrix comprising one or more but not all of the plurality of data entries;
     identify at least a first set of right singular vectors and a first set of singular values of the subset of the matrix;
     reduce dimensionality of the subset by an amount of energy of a selected data entry of the subset based on the first set of right singular vectors and the first set of singular values;
     incorporate at least one additional data entry from the matrix into the subset;
     update the first set of right singular vectors and the first set of singular values of the subset based on the at least one additional data entry to produce an updated first set of right singular vectors and an updated first set of singular values;
     generate the low-rank approximation of the matrix based on the updated first set of right singular vectors and the updated first set of singular values;
   an approximated term-document generator executable by the at least one processor and configured to generate an approximated term-document matrix based on the low-rank approximation; and a scoring component configured to:
  receive a query, from a user, defining a search and apply the query to the approximated term-document matrix to generate at least one relevancy score, and
  return query results associated with the at least one relevancy score to the user.

2. The system of claim 1, wherein the at least one desired dimension of the low-rank approximation includes at least one of a desired row size and a desired column size of the low-rank approximation.

3. The system of claim 1, wherein the selected data entry of the subset is one of a data entry with a least amount of energy in the subset and a data entry with a median amount of energy in the subset.

4. The system of claim 1, wherein the sketching component is configured to update the first set of right singular vectors and the first set of singular values by determining a singular value decomposition (SVD) of a combination of the first set of singular values and a projection of the additional data entry onto the first set of right singular vectors to produce at least a second set of right singular vectors and a second set of singular values.

5. The system of claim 4, wherein the sketching component is configured to update the first set of right singular vectors and the first set of singular values based on at least the second set of singular values, the first set of right singular vectors, and the second set of right singular vectors.

6. The system of claim 1, wherein the sketching component is configured to update the first set of right singular vectors and the first set of singular values by projecting the additional data entry onto the first set of right singular vectors and generating an orthonormal basis for an orthogonal component of the additional data entry to the first set of right singular vectors.

7. The system of claim 6, wherein the sketching component is configured to update the first set of right singular vectors and the first set of singular values by determining a singular value decomposition (SVD) of a combination of the first set of singular values, the projection of the additional data entry onto the first set of right singular vectors, and the orthonormal basis to produce at least a second set of right singular vectors and a second set of singular values.

8. The system of claim 7, wherein the sketching component is configured to update the first set of right singular vectors and the first set of singular values based on at least the second set of singular values, the orthonormal basis, the first set of right singular vectors, and the second set of right singular vectors.

9. A computer implemented method of generating a low-rank approximation of a matrix, the method comprising:
  receiving, by at least one processor, the matrix and at least one desired dimension of the low-rank approximation, the matrix including a plurality of data entries;
  selecting, by the at least one processor, a subset of the matrix comprising one or more but not all of the plurality of data entries;
  identifying, by the at least one processor, a first set of right singular vectors and a first set of singular values of the subset of the matrix;
  reducing, by the at least one processor, dimensionality of the subset by an amount of energy of a selected data entry of the subset based on the first set of right singular vectors and the first set of singular values;
  incorporating, by the at least one processor, at least one additional data entry from the matrix into the subset;
  updating, by the at least one processor, the first set of right singular vectors and the first set of singular values based on the at least one additional data entry to produce an updated first set of right singular vectors and an updated first set of singular values; and
  generating, by the at least one processor, the low-rank approximation of the matrix based on the updated first set of right singular vectors and the updated first set of singular values;
  generating, by the at least one processor, an approximated term-document matrix based on the low-rank approximation;
  receiving, by the at least one processor, a query from a user defining a search and applying the query to the approximated term-document matrix to generate at least one relevancy score; and
  returning, by the at least one processor, query results associated with the at least one relevancy score to the user.

10. The method of claim 9, wherein the updating the first set of right singular vectors and the first set of singular values includes determining a singular value decomposition (SVD) of a combination of the first set of singular values and a projection of the additional data entry onto the first set of right singular vectors to generate at least a second set of right singular vectors and a second set of singular values.

11. The method of claim 10, wherein the updating the first set of right singular vectors and the first set of singular values further includes updating the first set of right singular vectors and the first set of singular values based on at least the second set of singular values, the first set of right singular vectors, and the second set of right singular vectors.

12. The method of claim 9, wherein the updating the first set of right singular vectors and the first set of singular values includes projecting the additional data entry onto the first set of right singular vectors and generating an orthonormal basis for an orthogonal component of the data entry to the first set of right singular vectors.

13. The method of claim 12, wherein the updating the first set of right singular vectors and the first set of singular values further includes determining a singular value decomposition (SVD) of a combination of the first set of singular values with the projection of the additional data entry onto the first set of right singular vectors and the orthonormal basis to generate at least a second set of right singular vectors and a second set of singular values.

14. The method of claim 13, wherein the updating the first set of right singular vectors and the first set of singular values further includes updating the first set of right singular vectors and the first set of singular values based on at least the second set of singular values, the orthonormal basis, the first set of right singular vectors, and the second set of right singular vectors.

15. A non-transitory computer-readable storage medium storing code executable by at least one processor and configured to:
  receive a term-document matrix defining a frequency of a plurality of terms in a plurality of documents, wherein the term document-matrix comprises a plurality of data entries;
  receive at least one desired dimension of a low-rank approximation of the term-document matrix;
  select a subset of the term-document matrix comprising one or more but not all of the plurality of data entries;
  identify at least a first set of right singular vectors and a first set of singular values of the subset of the term-document matrix;

reduce dimensionality of the subset by an amount of energy of a selected data entry of the subset based on the first set of right singular vectors and the first set of singular values, incorporate at least one additional data entry from the term-document matrix into the subset;

update the first set of right singular vectors and the first set of singular values of the subset based on the at least one additional data entry to produce an updated first set of right singular vectors and an updated first set of singular values;

generate the low-rank approximation of the term-document matrix based on the updated first set of right singular vectors and the updated first set of singular values;

generate an approximated term-document matrix based on the low-rank approximation;

receive a query, from a user, defining a search and apply the query to the approximated term-document matrix to generate at least one relevancy score, and return query results associated with the at least one relevancy score to the user.

\* \* \* \* \*